(12) United States Patent
Sugahara et al.

(10) Patent No.: US 7,933,558 B2
(45) Date of Patent: Apr. 26, 2011

(54) RADIO WAVE ARRIVAL STATE ESTIMATION SYSTEM, RADIO WAVE ARRIVAL STATE ESTIMATION METHOD, AND PROGRAM

(75) Inventors: Hiroto Sugahara, Tokyo (JP); Masahiro Motoyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 301 days.

(21) Appl. No.: 12/089,036

(22) PCT Filed: Oct. 4, 2006

(86) PCT No.: PCT/JP2006/319887
§ 371 (c)(1),
(2), (4) Date: Apr. 2, 2008

(87) PCT Pub. No.: WO2007/043416
PCT Pub. Date: Apr. 19, 2007

(65) Prior Publication Data
US 2009/0128411 A1    May 21, 2009

(30) Foreign Application Priority Data

Oct. 5, 2005  (JP) ................................. 2005-291936

(51) Int. Cl.
*H04W 24/00*   (2009.01)
(52) U.S. Cl. ...................... 455/67.11; 455/423; 455/446
(58) Field of Classification Search ............... 455/67.11, 455/423, 446
See application file for complete search history.

(56) References Cited

U.S. PATENT DOCUMENTS

2005/0088165 A1* 4/2005 Watanabe et al. .......... 324/76.14
2007/0019769 A1* 1/2007 Green et al. ................. 375/360

FOREIGN PATENT DOCUMENTS

| JP | 09-033584 A | 2/1997 |
|---|---|---|
| JP | 09-119955 A | 5/1997 |
| JP | 09-153867 A | 6/1997 |
| JP | 2003-318842 A | 11/2003 |
| JP | 2004-294133 A | 10/2004 |
| JP | 2005-072667 A | 3/2005 |

OTHER PUBLICATIONS

English Machine Translation of JP 2005-072667 A.*
English Abstract of JP 09119955 A.*
Hosoya, Yosio; Radio Wave Propagation Handbook, Realize Inc., 1999, p. 200-216 and 234-243.

* cited by examiner

*Primary Examiner* — Thomas H Tarcza
*Assistant Examiner* — Fred H Mull
(74) *Attorney, Agent, or Firm* — Sughrue Mion, PLLC (57) ABSTRACT

A radio wave propagation characteristic estimation system in a radio communication system includes: non-diffracted wave estimation device configured to estimate propagation characteristics of a radio wave reaching from a predetermined transmission point in a limited evaluation area to a plurality of reception points in the evaluation area and to estimate a component other than diffracted wave among the radio wave component reaching from the transmission point to the reception points; diffracted wave estimation device configured to estimate only a diffracted wave component among the radio components reaching from the transmission point to the respective reception points; and total radio wave component calculation device configured to calculate total radio wave propagation characteristics in the respective reception points considering the estimated result in the non-diffracted wave estimation device and the estimation result of the diffracted wave estimation device.

24 Claims, 8 Drawing Sheets

RADIO WAVE ARRIVAL STATE ESTIMATION SYSTEM, RADIO WAVE ARRIVAL STATE ESTIMATION METHOD, AND PROGRAM

APPLICABLE FIELD IN THE INDUSTRY

The present invention relates to a system for speedily estimating an effect of diffraction in a radio wave propagation characteristic (radio wave arrival state) estimation, a method thereof, and a program thereof.

BACKGROUND ART

A radio wave propagation characteristic estimation system (radio wave propagation simulator) is employed to assist the arrangement for a base station, a parent machine, or the like in a wireless communication system, and the optimization of parameters of the arranged base station and parent machine, or the like. The radio wave propagation simulator assesses a received power, a delay spread, or the like at an optional reception point to decide an installation side of a due transmitting station, so that the overall efficiency can be enhanced by reducing the number of the base stations to be arranged. Further, deciding an optimal parameter of the transmitting station enables a network quality of the wireless communication system to be enhanced.

The radio wave propagation simulation is largely divided into a simulation employing a statistical technique and a simulation employing a deterministic technique. The former statistical technique is a technique of giving an equation for estimating the propagation power loss (hereinafter, simply referred to as a propagation loss) with the arguments of a distance, a frequency, and so on to statistically determine the parameters on the basis of a large amount of data resulted from the actual measurements of the propagation loss. The details of the statistical technique are disclosed, for example, in Non-patent document 1 (Yosio Hosoya (supervisor), Radio Wave Propagation Handbook, REALIZE INC., 1999). On the other hand, the latter deterministic technique is a technique of pre-imitating propagation circumstances being estimated (a structure, an object, etc. that exert an influence upon the propagation of the radio wave) over a computer, deterministically calculating an influence that is exerted by these structure and object upon the radio wave radiated from an antenna, and estimating the radio wave state at the reception point. The deterministic technique is inferior to the statistical technique from a viewpoint of the operational processing amount, whereas the deterministic technique is higher in an estimation precision owing to deterministically taking an influence of the propagation circumstances into consideration. In particular, the statistical technique is difficult to apply, and rather, the deterministic technique is desirably applied in the circumstances where a lot of the structures and objects that exert an influence upon the radio wave propagation exist, for example, in a city, in a room, or the like.

There exists a raytracing method as a technique that is often employed, out of some deterministic techniques. The raytracing method is a method of, by considering that the radio wave radiated from an antenna is a collection of a number of radio wave rays, synthesizing the rays reaching to an observatory point, and obtaining the propagation loss and the amount of a delay on the premise that each ray is reflected and is transmitted repeatedly on the geometrical optics, and is propagated. Furthermore, the raytracing method is largely divided into a raylaunching method, and an imaging method. The details of the raylaunching method and the imaging method are disclosed, for example, in Non-patent document 1 and JP-P1997-33584A.

The raylaunching method is a technique of, successively tracing a truck of the ray on the assumption that the ray discretely radiated at each constant angle from a transmitting antenna is propagated while it is repeatedly reflected at and transmitted into the structure or the object. In a case of precisely estimating the propagation by employing the raylaunching method, an effect of diffraction other than the reflection or the transmission is desirably considered. As a technique of estimating the effect of diffraction by employing the raylaunching method, there exists the technique disclosed in JP-P2004-294133A. This technique is a technique of, at the time that the rays pass near an edge of the structure, allowing the rays equivalent to the diffracted wave to be generated at the above edge. The loss caused by the diffraction varies depending upon the direction at which the diffracted wave propagates after an occurrence of the diffraction, thereby necessitating generating a plurality of the rays as a diffracted wave component after an occurrence of the diffraction. This causes the problem that the number of the rays, which should be processed with an occurrence of one-time diffraction, increases, and thus the operational processing amount increases to that extent.

On the other hand, the imaging method is a technique of deciding a reflection and transmission path of the ray connecting between the transmitting/reception points by obtaining an imaging point against the reflection surface. The imaging method, which is capable of searching a strict propagation route of the ray between the transmitting/reception points, enables a higher estimation precision to be realized as compared with the raylaunching method. However, an increase in the number of the structures that are considered, and an increase in the maximum number of times of the reflection/transmission/diffraction cause the problem that the operational processing amount increases drastically. In particular, in a case of evaluating the radio wave propagation characteristic from a transmission point in a two-dimensional plane, the imaging method necessitates searching the propagation route of the ray at each reception point, whereby the operational processing amount furthermore increases to that extent. As a technique of reducing the operational processing amount of the imaging method, there exist, for example, the techniques disclosed in JP-P1997-33584A, JP-P1997-119955A, JP-P1997-153867A, JP-P2003-318842A, and JP-P2005-72667A.

The technology of each of JP-P1997-33584A, JP-P1997-119955A, JP-P2003-318842A, and JP-P2005-72667A, out of these patent documents, is for reducing the operational processing amount that is accompanied by a search for the propagation route of the ray, by reducing the number of the structures that are considered at the time of estimating the propagation, or simplifying a shape of the structure. For example, the technique of JP-P1997-33584A is for selecting and filing in advance a building existing in the road and the intersection in a street microcell constituting a service area along the road by arranging the base stations on the road, and estimating the propagation only by considering the above building. The technique of JP-P1997-119955A is for rectilinearly decomposing the road into the node subelements based upon road data indicative of the position of the road in the street microcell similar to the foregoing. The technique of JP-P2003-318842A is for pre-specifying the minimum value and the maximum value of the propagation delay time, and estimating the propagation by considering only the structure which causes the propagation delay time that is between the minimum value and the maximum value. The technique of JP-P2005-72667A is for searching a transmission point side prospect structure and a reception point side prospect structure, and estimating the propagation by considering only the above structure. These techniques could sacrifice the estimation precision in exchange of a reduction in the operational processing amount because the number of structures that are considered at the time of estimating the propagation is reduced, or a shape of the structure is simplified. Further, there is the case that a sufficient reduction in the operational processing amount cannot be attained depending upon the propagation circumstances.

On the other hand, the technique of JP-P1997-153867A is for pre-identifying presence or absence of the building existing between the transmission point and the reception point, obtaining the propagation loss by considering only a direct wave when the building is absent, and applying the imaging method only when the building is present, thereby to calculate the components of the reflected wave/transmitted wave/diffracted wave. The direct wave dominates in a case of where no obstructed view is afforded between the transmission point and the reception point, whereby at this reception point, the components of the reflected wave/transmitted wave/diffracted wave are not considered, thereby allowing a reduction in the operational processing amount to be realized. However, in a case of estimating the radio wave propagation characteristic in the city that is overcrowded with the buildings, almost all of the observatory points are not in prospect. Thus, applying the imaging method for all these points inevitably increases the operational processing amount.

Non-patent document 1: Yosio Hosoya (supervisor), Radio Wave Propagation Handbook, REALIZE INC. 1999.
Patent document 1: JP-P1997-33584A
Patent document 2: JP-P2004-294133A
Patent document 3: JP-P1997-119955A
Patent document 4: JP-P1997-153867A
Patent document 5: JP-P2003-318842A
Patent document 6: JP-P2005-72667A

DISCLOSURE OF THE INVENTION

Problems to be Solved by the Invention

As described so far, the radio wave propagation characteristic estimation system for precisely estimating the propagation considering the diffraction without significantly increasing the operational processing amount, a method thereof, and a program was not able to be provided notwithstanding employment of any of the related arts. For example, in a case of employing the technique disclosed in JP-P2004-294133A, the diffraction causes a plurality of the rays to be generated from one ray, and the number of the rays that should be processed increases at that extent, thereby drastically increasing the operational processing amount as compared with the case of considering no diffraction. Further, the technique disclosed in each of JP-P1997-33584A, JP-P1997-119955A, JP-P1997-153867A, JP-2003-318842A, and JP-P2005-72667A, being a means for realizing the imaging method at a high speed, originally is a technique that is grounded upon the imaging method, whereby the operational processing amount drastically increases as compared with the raylaunching method.

Means for Solving the Problems

The present invention for solving the above-mentioned problems, which is a method of estimating an arrival state of a radio wave, characterized in comprising: a non-diffracted wave estimation step of estimating an arrival state of a radio wave other than a diffracted wave out of the radio waves transmitted from a transmission source by employing a first technique of estimating a radio wave propagation state; and a diffracted wave estimation step of estimating an arrival state of the diffracted wave by employing a second technique of estimating a radio wave propagation state different from said first estimation technique.

The present invention for solving the above-mentioned problems, which is a method of estimating an arrival state of a radio wave, characterized in comprising: a non-diffracted wave estimation step of estimating an arrival state of a radio wave other than a diffracted wave out of the radio waves transmitted from a transmission source by employing a first technique of estimating a radio wave propagation state; a diffracted wave arrival point estimation step of estimating one or a plurality of diffraction-considering reception points that is estimated to be a point, at which the diffracted wave arrives, from the arrival state of the radio wave estimated in said non-diffracted wave estimation step; and a diffracted wave arrival state estimation step of estimating an arrival state of the diffracted wave at the diffraction-considering reception point estimated in said diffracted wave arrival point estimation step by employing a second technique of estimating a radio wave propagation state different from said first technique of estimating a radio wave propagation state.

The present invention for solving the above-mentioned problems, which is a system for estimating an arrival state of a radio wave, characterized in comprising: a non-diffracted wave estimating means for estimating an arrival state of a radio wave other than a diffracted wave out of the radio waves transmitted from a transmission source by employing a first technique of estimating a radio wave propagation state; and a diffracted wave estimating means for estimating an arrival state of the diffracted wave by employing a second technique of estimating a radio wave propagation state different from said first estimation technique.

The present invention for solving the above-mentioned problems, which is a system for estimating an arrival state of a radio wave, characterized in comprising: a non-diffracted wave estimating means for estimating an arrival state of a radio wave other than a diffracted wave out of the radio waves transmitted from a transmission source by employing a first technique of estimating a radio wave propagation state; a diffracted wave arrival point estimating means for estimating one or a plurality of diffraction-considering reception points that is estimated to be a point, at which the diffracted wave arrives, from the arrival state of the radio wave estimated by said non-diffracted wave estimating means; and a diffracted wave arrival state estimating means for estimating an arrival state of the diffracted wave at the diffraction-considering reception point estimated in said diffracted wave arrival point estimation means by employing a second technique of estimating a radio wave propagation state different from said first technique of estimating a radio wave propagation state.

The present invention for solving the above-mentioned problems, which is a program for estimating an arrival state of a radio wave, characterized in causing a computer to execute: a non-diffracted wave estimation process of estimating an arrival state of a radio wave other than a diffracted wave out of the radio waves transmitted from a transmission source by employing a first technique of estimating a radio wave propagation state; and a diffracted wave estimation process of estimating an arrival state of the diffracted wave by employing a second technique of estimating a radio wave propagation state different from said first estimation technique.

The present invention for solving the above-mentioned problems, which is a program for estimating an arrival state of a radio wave, characterized in causing a computer to execute: a non-diffracted wave estimation process of estimating an arrival state of a radio wave other than a diffracted wave out of the radio waves transmitted from a transmission source by employing a first technique of estimating a radio wave propagation state; a diffracted wave arrival point estimation process of estimating one or a plurality of diffraction-considering reception points that is estimated to be a point, at which the diffracted wave arrives, from the arrival state of the radio wave estimated in said non-diffracted wave estimation process; and a diffracted wave arrival state estimation process of estimating an arrival state of the diffracted wave at the diffraction-considering reception point estimated in said diffracted wave arrival point estimation process by employing a second technique of estimating a radio wave propagation state different from said first technique of estimating a radio wave propagation state.

An Advantageous Effect of the Invention

The present invention makes it possible to precisely estimate the propagation considering the diffraction without drastically increasing the operational processing amount by applying the speedy and precise radio wave propagation estimation technique for estimation of the waves other than the diffracted wave, for example, the direct wave/reflected wave/transmitted wave, and employing the radio wave propagation estimation technique having a light operation load, which is different from the estimation technique employed for estimation of the waves other than the diffracted wave, for the diffracted wave.

The present invention makes it possible to precisely estimate the propagation considering the diffraction without drastically increasing the operational processing amount by estimating the waves other than the diffracted wave, for example, the direct wave/reflected wave/transmitted wave, out of the radio waves that are in a state of arriving at the reception point, with the speedy and yet precise radio wave propagation estimation technique, obtaining a diffraction-considering reception point based upon this estimation result, and employing the radio wave propagation estimation technique, of which the operational load is lighter than that of the above-mentioned radio wave propagation estimation technique, for this obtained diffraction-considering reception point.

DESCRIPTION OF NUMERALS 10 non-diffracted wave estimating means
20 diffraction-considering reception point extracting means
30 diffracted wave estimating means
40 total radio wave component calculating means
40 control unit (CPU)
50 memory

BEST MODE FOR CARRYING OUT THE INVENTION

Figure 1:
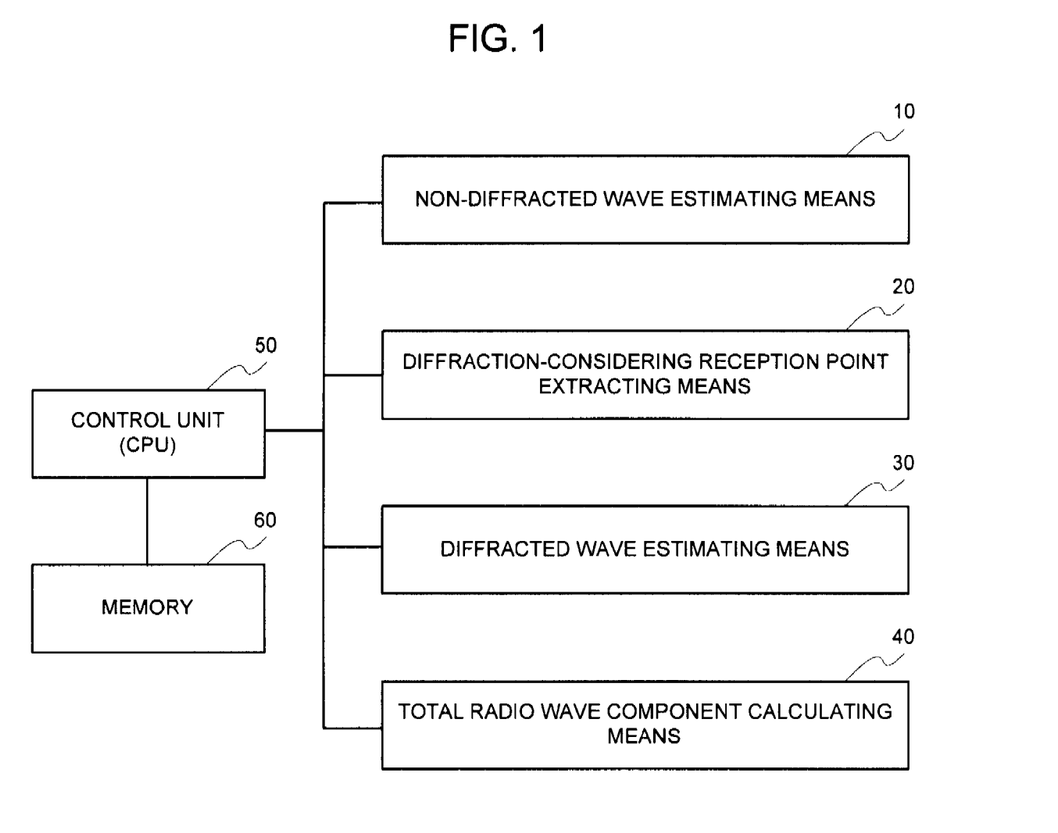
FIG. 1 is a functional block diagram illustrating an outline of an embodiment of the present invention.

Hereinafter, the embodiment of the present invention will be explained by making a reference to the accompanied drawings. FIG. 1 is a functional block diagram illustrating an outline of the embodiment of the present invention. The system of the embodiment of the present invention is a radio wave propagation characteristic estimation system in a wireless communication system, which estimate the propagation state (arrival state) of the radio wave reaching to one or a plurality of the reception points within an evaluation area from a predetermined transmission point within a limited evaluation area.

This system, as shown in FIG. 1, includes and is configured of a non-diffracted wave estimating means 10, a diffraction-considering reception point extracting means 20, a diffracted wave estimating means 30, a total radio wave component calculating means 40, a control unit 50, a memory 60.

The non-diffracted wave estimating means 10 has a function of, with a predetermined technique of estimating the radio wave propagation state, estimating the components (the direct wave, the reflected wave, the transmitted wave, etc.) other than the diffracted wave, out of the propagation characteristics reaching from the transmission point to the respective reception points without considering a diffraction effect. Herein, as a technique of estimating the radio wave propagation state that is applied for the non-diffracted wave estimating means 10, there exists the deterministic technique and specifically, there exists a raylaunching method, or the like, and this raylaunching method is for calculating the components (the direct wave, the reflected wave, the transmitted wave, etc.) other than the diffracted wave without considering the diffracted wave.

The diffraction-considering reception point extracting means 20 for estimating the point, which is estimated to be a point at which the diffracted wave arrives, has a function of, from the estimation result in the non-diffracted wave estimating means 10, extracting the diffraction-considering reception point that is expected to be a point to which the components other than the diffracted wave makes a small contribution and the diffracted component makes a relatively large contribution. Herein, the so-called diffraction-considering reception point is a reception point at which the diffracted wave has to be considered, out of the reception points.

The diffracted wave estimating means 30 for estimating the arrival state of the diffracted wave has a function of estimating only the diffracted wave component, out of the propagation characteristics reaching from the transmission point to the respective diffraction-considering reception points. Herein, as a technique of estimating the radio wave propagation state that is applied for the diffracted wave estimating means 30, there exists the technique of estimating the radio wave propagation state of which the operational load is smaller than that of the technique of estimating the radio wave propagation state that is applied for the non-diffracted wave estimating means 10. Specifically, as described in an example, a deterministic propagation estimation method, an imaging method, or the like is employed to estimate only the diffracted wave component out of the propagation characteristics reaching to respective diffraction-considering reception points.

The total radio wave component calculating means 40 has a function of estimating a total radio wave propagation characteristic (arrival state of the radio wave) considering the estimation result of the arrival state of the radio wave estimated by the non-diffracted wave estimating means 10, and the estimation result of the arrival state of the radio wave estimated by the diffracted wave estimating means 30 in all.

The control unit 50 is a CPU for controlling each of these means 10 to 40, and the memory 60 functions as an operational memory of this CPU.

Figure 2:
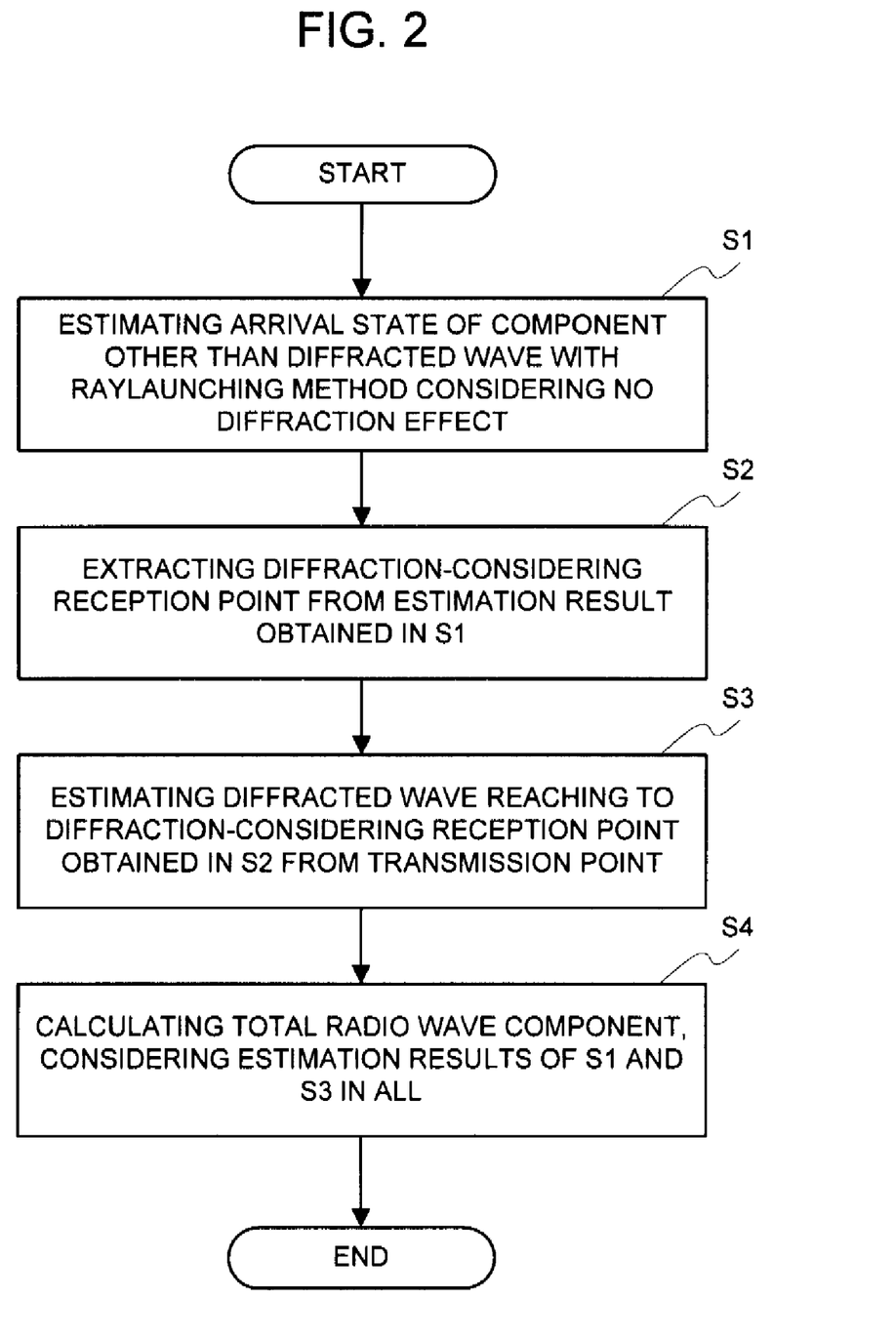
FIG. 2 is a flowchart illustrating an outline of an operation of the embodiment of the present invention.
Figure 3:
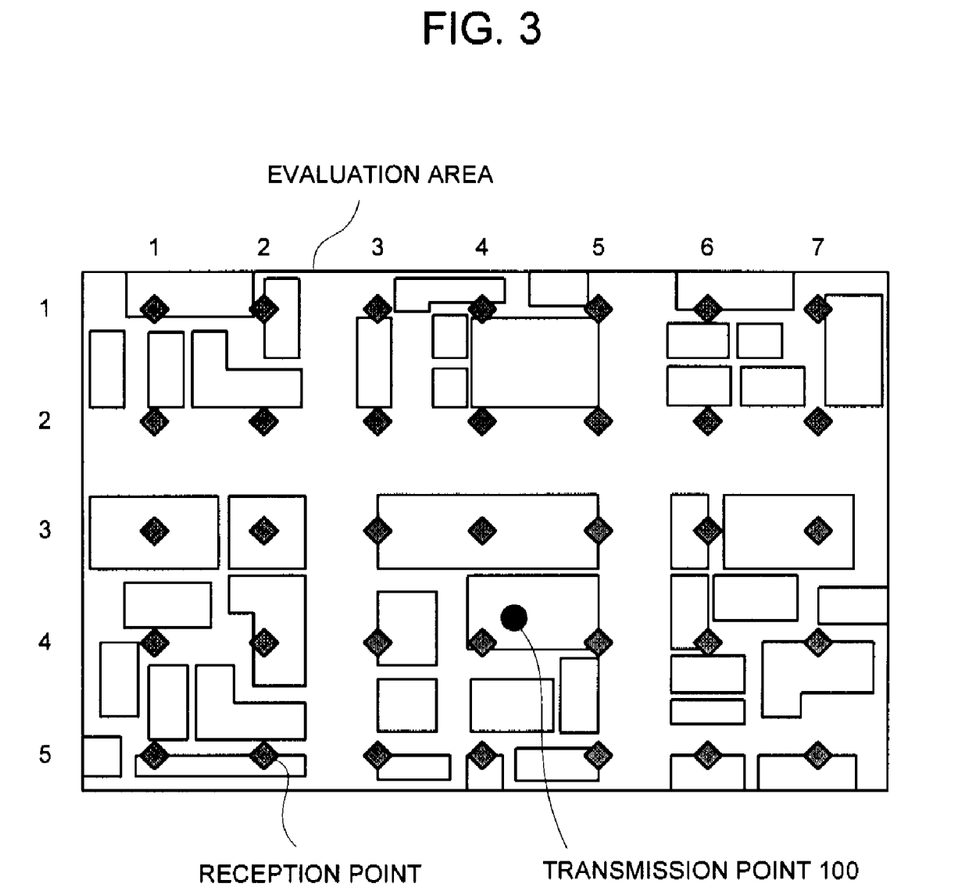
FIG. 3 is a view for explaining an operation of the embodiment of the present invention.

FIG. 2 is a flowchart illustrating an outline of the operation of FIG. 1, and FIG. 3 is a view for explaining its outline. In FIG. 3, a transmission point 100 (black circle), and a plurality of reception points (gray lozenge) are decided in the evaluation area. In an example of FIG. 3, the reception points are arranged in a grid-shape including five rows and seven columns. At first, the non-diffracted wave estimating means 10 estimates the arrival state of the components other than the diffracted wave out of the propagation characteristics reaching from the transmission point to respective reception points with the raylaunching method considering no diffraction effect (step S1).

Next, the diffraction-considering reception point extracting means 20 determines whether or not, from the propagation estimation result at each reception point in the step S1, the above reception point is a diffraction-considering reception point, and extracts the diffraction-considering reception point within the evaluation area (step S2). A determination as to whether or not each reception point is a diffraction-considering reception point is made, for example, by inspecting whether or not the propagation loss in the above reception point is within a pre-specified range. The reason why such a determination is made is described below. In a case where no obstacle such as the structure exists between the transmission point and the reception point, the propagation loss is relatively small, and yet the diffracted wave is not inclined to occur because the direct wave can reach to the reception point. On the other hand, in a case where the obstacle etc. exists between them, it can be said that the propagation loss is relatively large, and yet the possibility that the diffracted wave occurs due to its obstacle is high. For such a tendency, for example, pre-specifying the range of the propagation loss in a state where the direct wave cannot arrive reception point by reception point makes it possible to estimate that the reception point is a diffraction-considering reception point provided its propagation loss is within this range.

In addition hereto, only the diffracted wave component out of the radio wave components reaching from the transmission point 100 to the above diffraction-considering reception point is estimated (step S3). Thereafter, the total radio wave propagation characteristic is calculated by considering the estimation result in the step S1 and the estimation result in the step S3 in all (step S4).

So as to understand the foregoing embodiment more clearly, an example will be explained by making a reference to specific examples shown below.

Example 1

Figure 4:
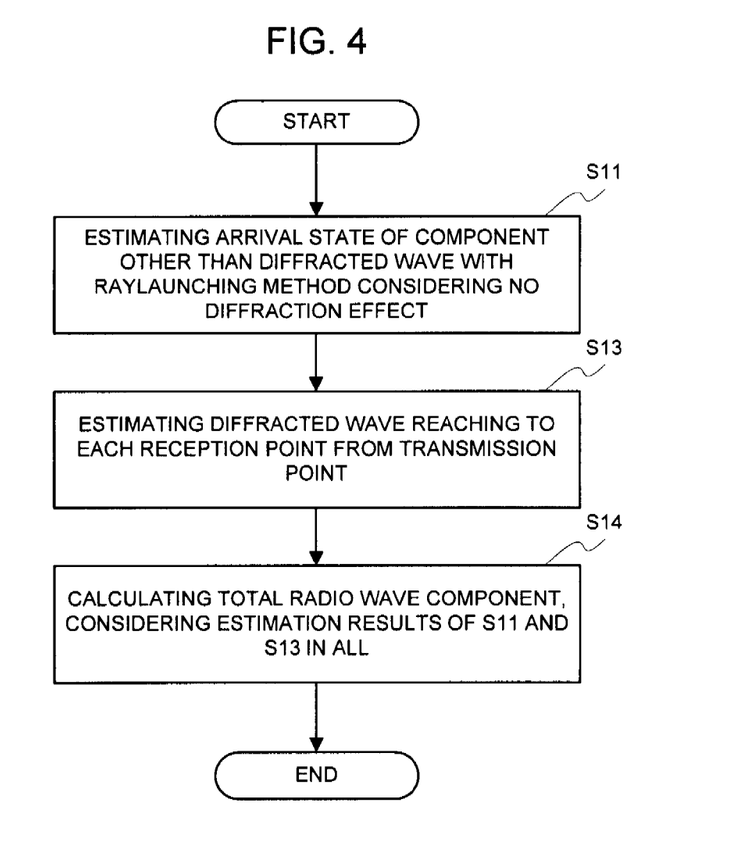
FIG. 4 is a flowchart illustrating an operation of a first example of the present invention.

The first example of the present invention will be explained. It is assumed that the evaluation area, and the transmission point and the reception point of the wireless system that are envisaged in this example are identical to ones shown in FIG. 3. FIG. 4 is a flowchart illustrating an operation of this example.

In this example, at first, the components other than the diffracted wave component out of the radio wave components reaching from the transmission point 100 to each reception point are estimated with the raylaunching method considering no diffraction effect (step S11). It is assumed the propagation loss at the reception point in the n-th row and the m-th column obtained herein is L1_n, m. Next, only the diffracted wave component out of the radio wave components reaching from the transmission point 100 to each reception point is estimated (step S13). The propagation estimation method different from the raylaunching method employed in the step S11 is applied for this estimation of the diffracted component. Further, the efficiency of the estimation is enhanced responding to the propagation circumstances with the technique shown below. It is assumed that the propagation loss at the reception point in the n-th row and the m-th column obtained herein is L2_n, m. In addition hereto, the radio wave component at each reception point is estimated by considering the estimation result in the step S11 and the estimation result in the step S13 in all (step S14). Specifically, by adding up L1_n, m and L2_n, m in a linear region, the propagation loss in which all components have been considered is obtained. Or, it does not matter that a phase difference between the propagation path obtained in the step S11 and the propagation path obtained in the step S13 is considered, thereby to add up respective propagation electric-field losses.

At the time of estimating the diffracted component in the step S12, the efficiency of the estimation of the diffracted component responding to the propagation circumstances is enhanced, for example, with the techniques shown below.

Figure 5:
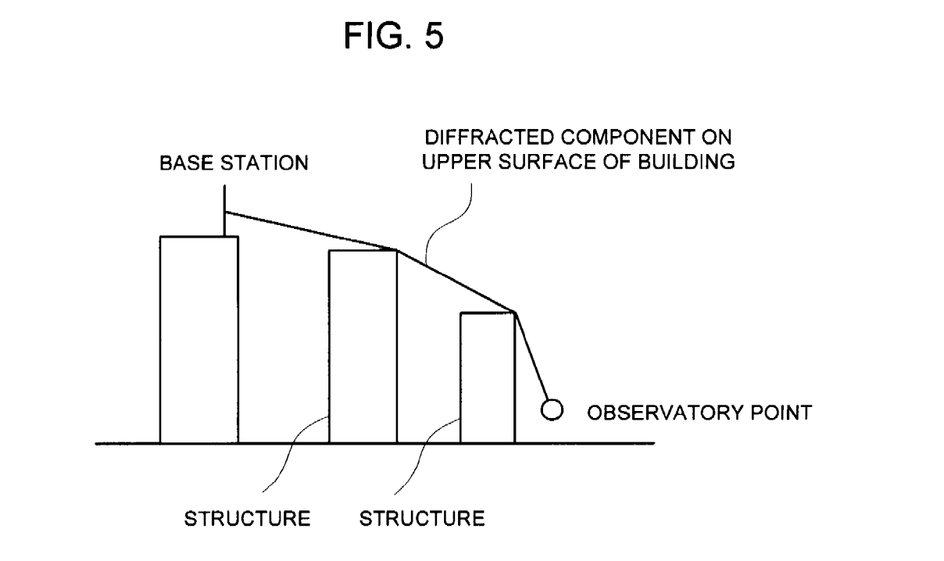
FIG. 5 shows an example of the efficient diffraction estimation in the embodiment of the present invention.

The first technique of enhancing the efficiency of the estimation of the diffracted component is for calculating only the diffracted component at the upper surface (roof) of the structure existing between the transmission point and the reception point. An example of the diffracted wave on the upper surface of the structure is shown in FIG. 5. The small operational processing amount is enough in this technique because it is enough to search the diffraction point by considering only the building existing between the transmission point and the reception point.

Figure 6:
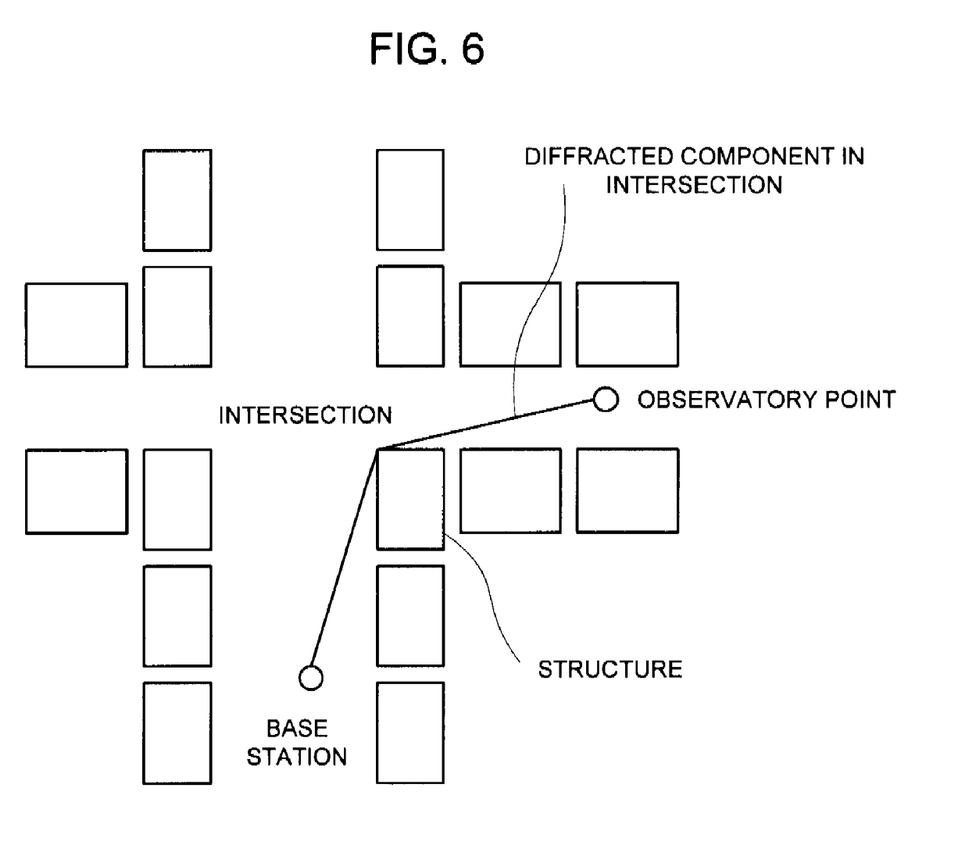
FIG. 6 shows an example of the efficient diffraction estimation in the embodiment of the present invention.

The second technique of enhancing the efficiency of the estimation of the diffracted component is for connecting the transmission point and the reception point along a road and calculating only the diffracted component at the structure in the intersection existing in a halfway route thereof. An example of the diffracted wave at the structure in the intersection is shown in FIG. 6. In this technique, causing positional information of the road and that of the structure to pre-correspond to each other makes it possible to easily detect the diffraction point in the intersection. Further, in a case where no positional information of the road exists, the road is identified from a distance between the neighboring buildings.

The third technique of enhancing the efficiency of the estimation of the diffracted component is for making reference to a distance between the transmission point and the reception point or information of undulations, and calculating the diffracted component with statistical technique. As a statistical technique that is employed herein, for example, the technique to which an Okumura-Hata model is applicable exists. However, the propagation loss that is calculated with the general model includes the component as well other than the diffracted wave. Thereupon, it is desirable to regard the loss obtained by adding a constant-level loss to the calculated propagation loss as a diffraction loss, and to obtain the diffracted component.

The fourth technique of enhancing the efficiency of the estimation of the diffracted component is for making a reference to the estimation result of the propagation loss obtained in the step S11 (the raylaunching method considering no diffraction), and based upon the average propagation loss in the neighborhood of a reception point at which the diffracted component is obtained, calculating the diffraction loss at the above reception point. Herein, as an average propagation loss in the neighborhood of the above reception point, for the reception points, of which the propagation loss of the neighborhood has reached a constant level or more, the average value of these propagation losses is employed. The foregoing average propagation loss includes the components other than the diffracted wave, and as a rule, the magnitude of the diffracted component is smaller as compared with that of these components. Thereupon, the loss obtained by adding a constant-level loss to the foregoing average propagation loss is regarded as a diffraction loss, and the diffracted component is obtained.

The fifth technique of enhancing the efficiency of the estimation of the diffracted component is for making a reference to the estimation result of the propagation loss obtained in the step S11 (the raylaunching method considering no diffraction), and from the estimation result of the propagation loss in the step S11 in an upper surface or a side wall of the structure or object that is in prospect from a reception point at which the diffracted component is obtained, and an estimation result of an incoming direction, extracting the component reaching to the above reception point by newly considering the diffraction on the above upper surface or side wall, and calculating the diffraction loss at the above reception point by considering all of these propagation losses.

As is the case of this embodiment, enhancement in the efficiency of the estimation of the diffracted component as described above is accomplished by calculating the diffracted component with a means other than the raylaunching method. As described above, applying the speedy and yet precise raylaunching method for estimation of the waves other than the diffracted wave, for example, the direct wave/reflected wave/transmitted wave, and executing the propagation estimation of which the efficiency has been enhanced for the diffracted wave make it possible to provide a radio wave propagation characteristic estimation system for precisely estimating the propagation considering the diffraction without significantly increasing the operational processing amount, a method thereof, and a program.

Example 2

Figure 7:
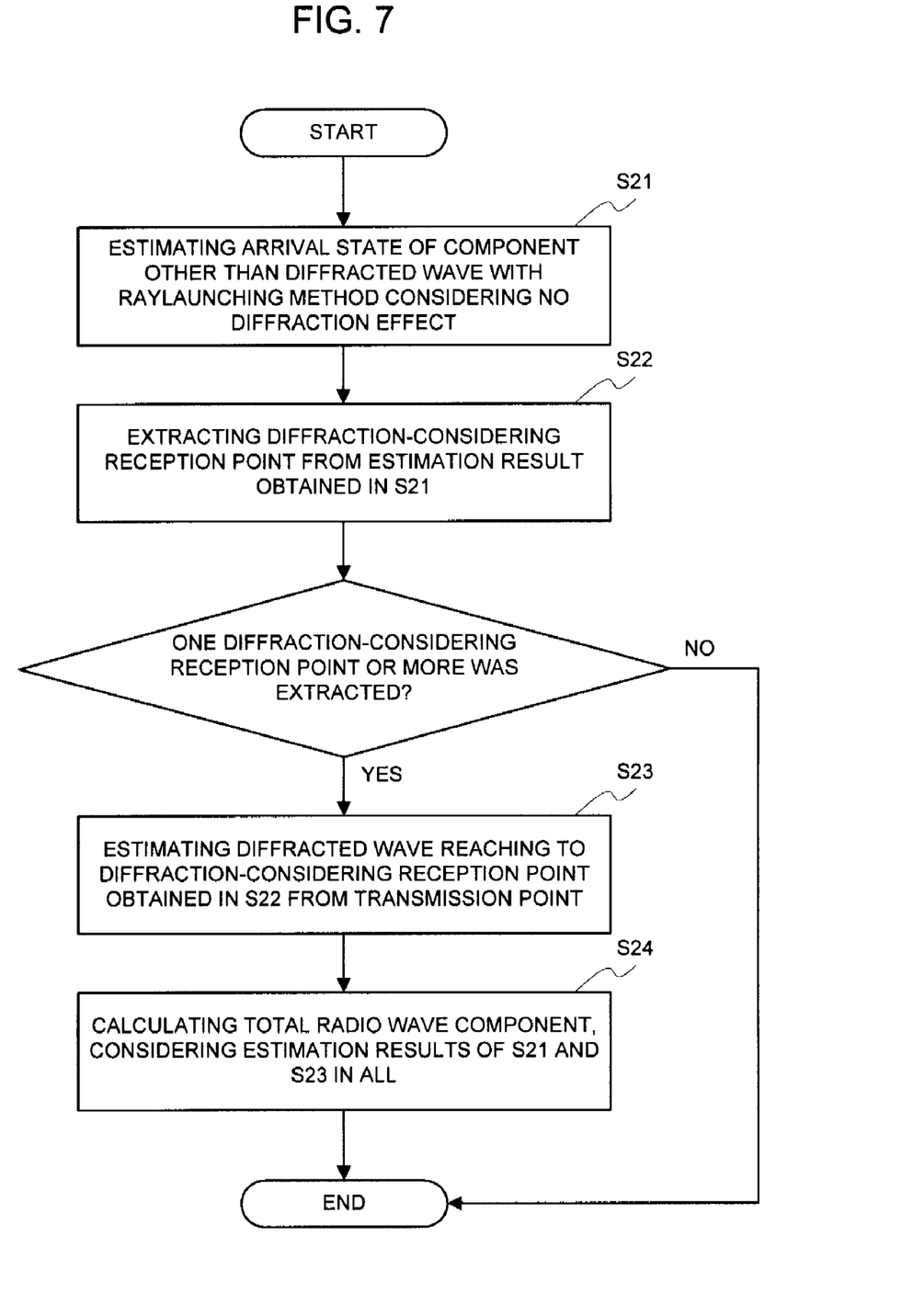
FIG. 7 is a flowchart illustrating an operation of a second example of the present invention.

The second example of the present invention will be explained. It is assumed that the evaluation area, and the transmission point and the reception point of the wireless system that are envisaged in this example are identical to ones shown in FIG. 3. FIG. 7 is a flowchart illustrating an operation of this example.

In this example, at first, the components other than the diffracted wave component out of components of the radio waves reaching from the transmission point 100 to respective reception points are estimated with the raylaunching method considering no diffraction effect (step S21). It is assumed that the propagation loss at the reception point in the n-th row and the m-th column obtained herein is L1_n, m. Next, it is determined from the propagation estimation result at each reception point in the step S21 whether or not the above reception point is a diffraction-considering reception point, and the diffraction-considering reception point within the evaluation area is extracted (step S22). A determination as to whether or not each reception point is a diffraction-considering reception point is made by inspecting whether or not the propagation loss at the above reception point is within a pre-specified range. The details of the extraction method will be described below.

In the step S22, in a case where one diffraction-considering reception point or more has been found, only the diffracted wave component out of the radio wave components reaching from the transmission point 100 to the above diffraction-considering reception point is estimated (step S23). The propagation estimation method different from the raylaunching method employed in the step S21 is applied for this estimation of the diffracted component. Further, the efficiency of the estimation responding to the propagation circumstances is enhanced with the technique shown in the example 1. It is assumed that the propagation loss at the reception point in the n-th row and the m-th column obtained herein is L2_n, m.

In addition hereto, the radio wave component at each reception point is estimated by considering the estimation result obtained in the step S21 and the estimation result obtained in the step S23 in all (step S24). Specifically, in a case where a reception point (n, m) is a diffraction-considering reception point, L1_n, m and L2_n, m are added up in a linear region, thereby to obtain the propagation loss in which all components have been considered. Or, it does not matter that a phase difference between the propagation path obtained in the step S21 and the propagation path obtained in the step S23 is considered, thereby to add up respective propagation electric-field losses. In the step S22, in a case where no diffraction-considering reception point has been found, the processes of the step S23 and the step S24 are not performed, and the estimation result of the step S22 becomes a final estimation result as it stands.

At the time of extracting the diffraction-considering reception point in the step S22, for example, the techniques shown below are employed.

The first technique of extracting the diffraction-considering reception point is for measuring a linear distance from the transmission point to each reception point, and regarding the reception point, of which the propagation loss is at a constant level or lower as against the propagation loss obtained by a propagation loss equation expressing that the propagation attenuates in proportion to the distance, as a diffraction-considering reception point. Herein, as the foregoing propagation loss equation, for example, a theoretical equation of a free space propagation loss may be employed, and a statistical equation such as an Okumura-Hata model may be employed The second technique of extracting the diffraction-considering reception point is for making a reference to the estimation result of the propagation loss obtained in the foregoing step S21 (the raylaunching method considering no diffraction) and regarding the reception point for obtaining the diffracted component, of which the propagation loss is at a constant level or lower as against the average propagation loss in the neighborhood of the above reception point, as a diffraction-considering reception point. Herein, as an average propagation loss in the neighborhood of the above reception point, for the reception points, of which the propagation loss of the neighborhood has reached a constant level or more, the average value of these propagation losses is employed. As a rule, the diffracted component, of which the propagation loss is larger than that of the components other than the diffracted wave, makes a small contribution to the propagation loss. For this, the reception point to which the components other than the diffracted wave make a large contribution is hardly affected by addition of the diffracted component.

The foregoing first and second techniques are for realizing a reduction in the operational processing amount by removing such a reception point from the diffraction-considering reception points, respectively.

The third technique of extracting the diffraction-considering reception point is for regarding the reception point, of which the neighborhood has an average propagation loss smaller than a maximum allowable propagation loss of the wireless system under evaluation, as a diffraction-considering reception point. In a case where the average propagation loss in the neighborhood of a certain reception point falls below a minimum reception sensitivity of the wireless system that is currently under evaluation, it is supposed that its reception point is sufficiently remote from the base station, the possibility that a significant value (a value smaller than the maximum allowable propagation loss of the wireless system under evaluation) is estimated even though the diffracted component is calculated is low. In this technique, such a reception point is removed from the diffraction-considering reception points. Or, the technique may be employed of regarding the reception point, of which the average propagation loss of the neighborhood is at a constant level or higher as against the propagation loss that is obtained with propagation loss equation expressing that the propagation attenuates in proportion to a distance, as a diffraction-considering reception point.

The foregoing first extraction method or second extraction method is desirably combined with the foregoing third extraction method. It is expected that combining both allows the number of the diffraction-considering reception points to be reduced all the more as against the case that they are not combined, thereby making it possible to realize a reduction in the operational processing amount to that extent.

In this example, limiting the reception point, at which the diffracted component is estimated, only to the extracted diffraction-considering reception point, for the example 1 makes it possible to provide a radio wave propagation characteristic estimation system capable of furthermore reducing the operational processing amount, a method thereof, and a program.

Example 3

Figure 8:
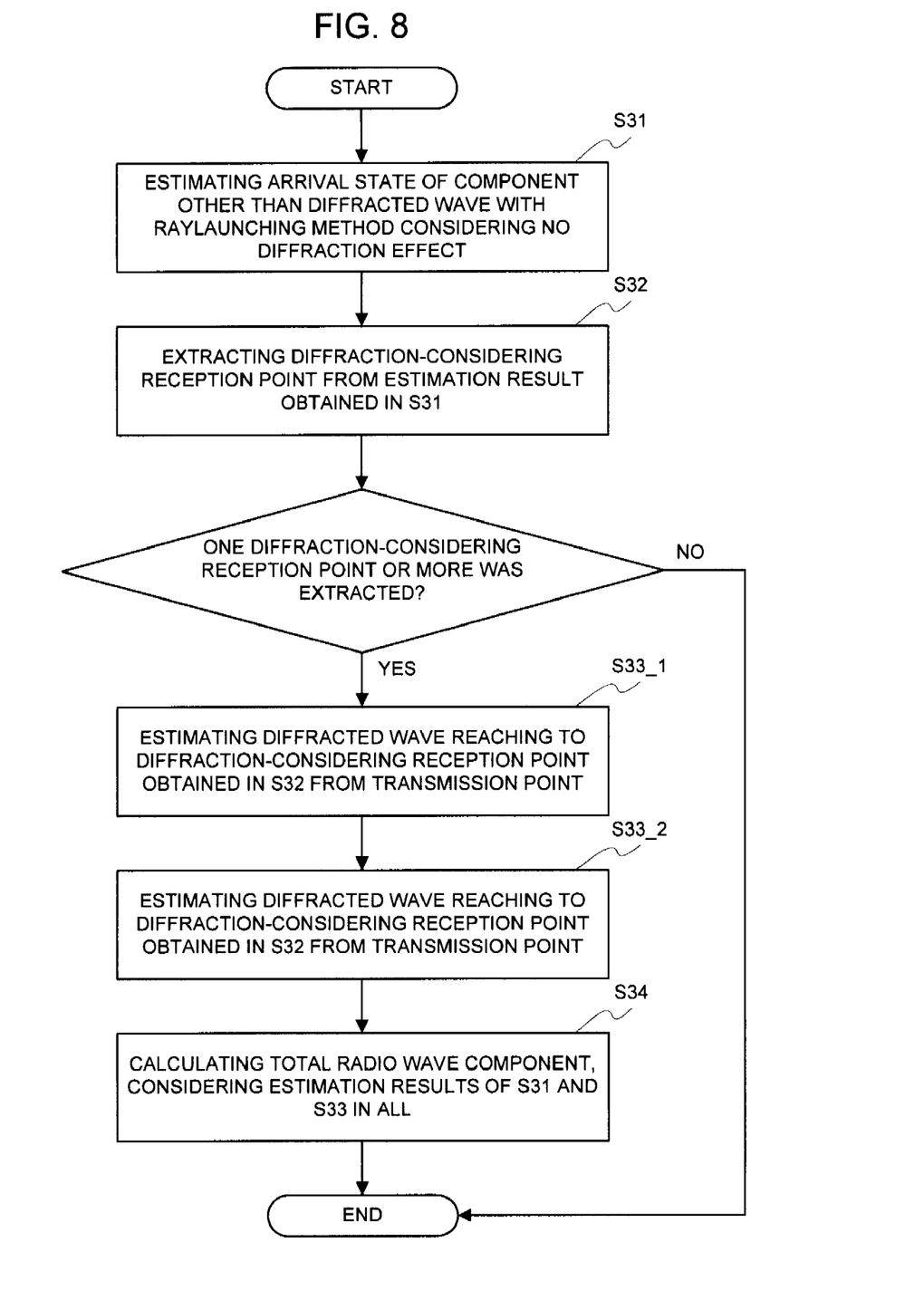
FIG. 8 is a flowchart illustrating an operation of a third example of the present invention.

The third example of the present invention will be explained. It is assumed that the evaluation area, and the transmission point and the reception point of the wireless system that are envisaged in this example are identical to ones shown in FIG. 3. FIG. 8 is a flowchart illustrating an operation of this example.

In this example, at first, the components other than the diffracted wave component out of components of the radio wave component reaching from the transmission point 100 to respective reception points are estimated with the raylaunching method considering no diffraction effect (step S31). It is assumed that the propagation loss at the reception point in the n-th row and the m-th column obtained herein is $L1\_n, m$.

Next, it is determined from the propagation estimation result at each reception point in the step S31 whether or not the above reception point is a diffraction-considering reception point, and the diffraction-considering reception point within the evaluation area is extracted (step S32). A determination as to whether or not each reception point is a diffraction-considering reception point is made by inspecting whether or not the propagation loss at the above reception point is within a pre-specified range. The details of the extraction method are similar to that described in the example 2.

In the step S32, in a case where one diffraction-considering reception point or more has been found, only the diffracted wave component out of the radio wave components reaching from the transmission point 100 to the above diffraction-considering reception point is estimated (step S33). The propagation estimation method different from the raylaunching method employed in the step S31 is applied for this estimation of the diffracted component. Further, a plurality of the different techniques out of the techniques of enhancing the efficiency of the estimation of the diffracted component shown in the example 1 are employed, thereby to estimate the diffracted components technique by technique.

It is assumed that the propagation losses at the reception point in the n-th row and the m-th column obtained herein are $L2\_n, m\_1$, and $L2\_n, m\_2$, respectively. Any of $L2\_n, m\_1$, and $L2\_n, m\_2$, or a total of both is adopted as a propagation loss $L2\_n, m$ at each diffraction-considering reception point.

In addition hereto, the radio wave component at each reception point is estimated by considering the estimation result obtained in the step S31 and the estimation result obtained in the step S33 in all (step S44). Specifically, in a case where a reception point (n, m) is a diffraction-considering reception point, $L1\_n, m$ and $L2\_n, m$ are added up in a linear region, thereby to obtain the propagation loss in which all components have been considered.

Or, it does not matter that a phase difference between the propagation path obtained in the step S31 and the propagation path obtained in the step S33 is considered, thereby to add up respective propagation electric-field losses. In the step S32, in a case where no diffraction-considering reception point has been found, the processes of the step S33 and the step S34 are not performed, and the estimation result of the step S32 becomes a final estimation result as it stands.

In this example, the diffracted component is estimated with a plurality of the different techniques for the first example, or the second example. Even in a case where the diffracted component estimated with a certain technique is not a necessary and yet sufficient value, this raises the possibility that the necessary and yet sufficient diffraction loss is estimated at the above reception point by applying a result estimated with another technique. This allows an enhancement in the estimation precision to be realized.

Example 4

Figure 9:
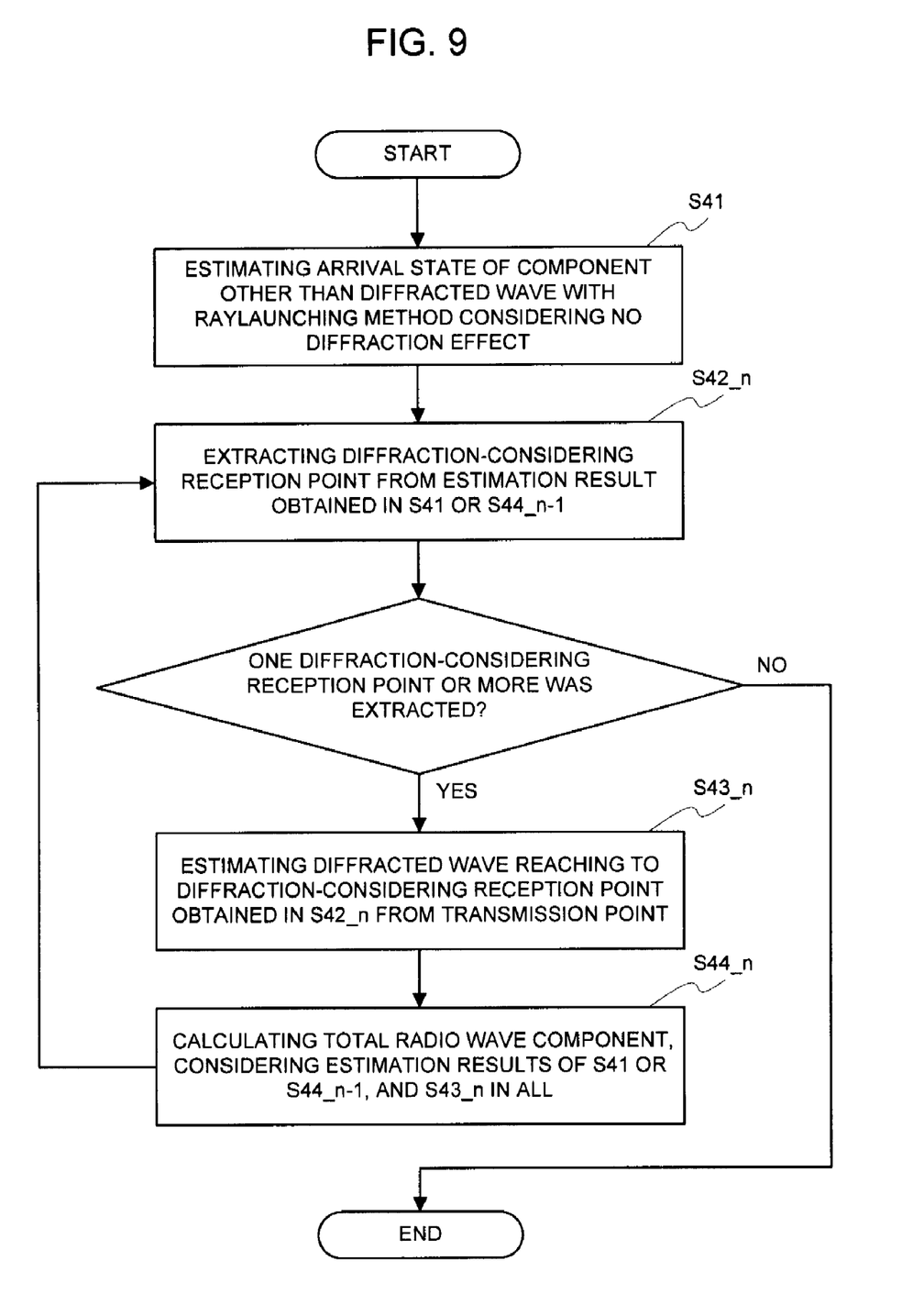
FIG. 9 is a flowchart illustrating an operation of the third example of the present invention.

The fourth example of the present invention will be explained. It is assumed that the evaluation area, and the transmission point and the reception point of the wireless system that are envisaged in this example are identical to ones shown in FIG. 3. FIG. 9 is a flowchart illustrating an operation of this example.

In this example, at first, the components other than the diffracted wave component out of the radio wave components reaching from the transmission point 100 to respective reception points are estimated with the raylaunching method considering no diffraction effect (step S41). It is assumed that the propagation loss at the reception point in the n-th row and the m-th column obtained herein is $L1\_n, m$. Next, it is determined from the propagation estimation result at each reception point in the step S41 whether or not the above reception point is a diffraction-considering reception point, and the diffraction-considering reception point within the evaluation area is extracted (step S42\_1). A determination as to whether or not each reception point is a diffraction-considering reception point is made, by inspecting whether or not the propagation loss at the above reception point is within a pre-specified range. The details of the extraction method are similar to that described in the example 2.

In the step S42_1, in a case where one diffraction-considering reception point or more has been found, only the diffracted wave component out of the radio wave components reaching from the transmission point 100 to the above diffraction-considering reception point is estimated (step S43_1). The propagation estimation method different from the raylaunching method employed in the step S41 is applied for this estimation of the diffracted component. Further, at the time of estimating the diffracted component in the step S43_1, the efficiency of the estimation responding to the propagation circumstances is enhanced with the technique shown in the example 1.

It is assumed that the propagation loss at the reception point in the n-th row and the m-th column obtained herein is L2_n, m. In addition hereto, the radio wave component at each reception point is estimated by considering the estimation result obtained in the step S41 and the estimation result obtained in the step S43_1 in all (step S44_1). Specifically, in a case where a reception point (n, m) is a diffraction-considering reception point, L1_n, m and L2_n, m are added up in a linear region, thereby to obtain the propagation loss in which all components have been considered.

Or, it does not matter that a phase difference between the propagation path obtained in the step S41 and the propagation path obtained in the step S43_1 is considered, thereby to add up respective propagation electric-field losses. Thereafter, it is determined from the propagation estimation result at each reception point in the step S44_1 whether or not the above reception point is a diffraction-considering reception point, and the diffraction-considering reception point within the evaluation area is extracted (step S42_2). Herein, in a case where one diffraction-considering reception point or more has been found, the diffracted wave component is estimated with the technique different from the raylaunching method employed in the step S41 or the technique employed in the step S43_1 (step 43_2), and the radio wave component at each reception point is estimated from the estimation result obtained in the step S44_1 and the estimation result obtained in the step S43_2 (step S44_2).

Thereafter, a step of extracting the diffraction-considering reception point is performed once again. The processes of the step 42_n (n=1, 2, 3 . . . ) to the step 44_n are continued until the extraction of the diffraction-considering reception point is completed. For example, provided that the diffraction-considering reception point has not been extracted in the step S42_n, the propagation characteristic obtained in the step S44_n−1 becomes a final estimation result as it stands.

In this example, the extraction of the diffraction-considering reception point and the estimation of the diffracted component are repeated for the first example or the second example. Even in a case where the necessary and yet sufficient diffraction loss has not been estimated with the one-time estimation of the diffracted component, this raises the possibility that the necessary and yet sufficient diffraction loss is estimated by applying another technique for the second-time estimation and the estimation subsequent hereto. This allows an enhancement in the estimation precision to be realized.

Example 5

In the foregoing example 1 to the example 4, at the time of obtaining the diffraction-considering reception point, the raylaunching method considering no diffraction effect was employed.

This example differs from each of the example 1 to the example 4 in a point of obtaining the diffraction-considering reception by employing layout information of the structure such as the building existing within the area at which the arrival state of the radio wave is estimated.

Specifically, at first, a determination as to whether a prospect is afforded between the transmission point and the reception point within the area is made. And, in a case where a prospect is not afforded, that is, in a case where the obstacle such as the building exists between the transmission/reception points, it is estimated that its reception point is a diffraction-considering reception point.

The method of estimating the radio propagation state after extracting the diffraction-considering reception point with this method is similar to the method shown in each of the example 1 to the example 4, so its explanation is omitted.

Further, the method of comparing the diffraction-considering reception point extracted by employing the method of this example with the diffraction-considering reception point extracted by employing the methods of the example 1 to the example 4, and finally extracting the point extracted by both as a diffraction-considering reception point, or the method of extracting the point extracted by any of them as a diffraction-considering reception point also can be adopted.

In the foregoing explanation of the embodiment and the examples, the explanation was made based upon the conception that the function was realized in a hardware manner. However, the above-mentioned function also can be realized in a software manner by loading a program for executing each means (process) into a computer device, and executing it. For example, this program, which is retained in a magnetic disc, a semiconductor storage device, or a record medium other than these, and is loaded into the computer device from its record medium, controls an operation of the computer device, thereby to realize the foregoing function.

The radio wave arrival state estimation system in accordance with the present embodiment, which is a radio wave propagation characteristic estimation system for estimating propagation characteristic of a radio wave reaching from a predetermined transmission point within a limited evaluation area to a plurality of reception points within the evaluation area, is characterized in including a non-diffracted wave estimating means for estimating the components other than the diffracted wave, out of the radio wave components arriving from the transmission point to the respective reception points, a diffracted wave estimating means for estimating only the diffracted wave component, out of the radio wave components arriving from the transmission point to the respective reception points, and a total radio wave component calculating means for calculating a total radio wave propagation characteristic in the respective reception points considering an estimation result in the non-diffracted wave estimating means and an estimation result in the diffracted wave estimating means.

The radio wave arrival state estimation system in accordance with the present embodiment, which is a radio wave propagation characteristic estimation system for estimating propagation characteristic of a radio wave reaching from a predetermined transmission point within a limited evaluation area to a plurality of reception points within the evaluation area, is characterized in including a non-diffracted wave estimating means for estimating the components other than the diffracted wave, out of the radio wave components arriving from the transmission point to the respective reception points, a diffraction-considering reception point extracting means for extracting the reception point at which the components other than the diffracted wave is within a pre-specified range, out of the respective reception points, as a diffraction-considering reception point based upon the estimation result in the non-diffracted wave estimating means, a diffracted wave estimating means for estimating only the diffracted wave component, out of the radio wave components reaching from the transmission point to the respective reception points extracted as the diffraction-considering reception point, and a total radio wave component calculating means for calculating a total radio wave propagation characteristic in the respective reception points considering an estimation result in the non-diffracted wave estimating means and an estimation result in the diffracted wave estimating means.

A raylaunching method considering no diffraction effect is preferably employed for the non-diffracted wave estimating means. Further, a deterministic propagation estimation method in which the component is limited, or a statistical propagation estimation method is preferably employed for the diffracted wave estimating means.

The radio wave arrival state estimation method in accordance with the present embodiment, which is a radio wave propagation characteristic estimation method of estimating propagation characteristic of a radio wave reaching from a predetermined transmission point within a limited evaluation area to a plurality of reception points within the evaluation area, is characterized in including a non-diffracted wave estimation step of estimating the components other than the diffracted wave, out of the radio wave components arriving from the transmission point to the respective reception points, a diffracted wave estimation step of estimating only the diffracted wave component, out of the radio wave components arriving from the transmission point to the respective reception points, and a total radio wave component calculation step of calculating a total radio wave propagation characteristic in the respective reception points considering an estimation result in the non-diffracted wave estimation step and an estimation result in the diffracted wave estimation step.

The radio wave arrival state estimation method in accordance with the present embodiment, which is a radio wave propagation characteristic estimation method of estimating propagation characteristic of a radio wave reaching from a predetermined transmission point within a limited evaluation area to a plurality of reception points within the evaluation area, is characterized in including a non-diffracted wave estimation step of estimating the components other than the diffracted wave, out of the radio wave components arriving from the transmission point to the respective reception points, a diffraction-considering reception point extraction step of extracting the reception point at which the components other than the diffracted wave is within a pre-specified range, out of the respective reception points, as a diffraction-considering reception point based upon the estimation result in the non-diffracted wave estimation step, a diffracted wave estimation step of estimating only the diffracted wave component, out of the radio wave components reaching from the transmission point to the respective reception points extracted as a diffraction-considering reception point, and a total radio wave component calculation step of calculating a total radio wave propagation characteristic in the respective reception points considering an estimation result in the non-diffracted wave estimation step and an estimation result in the diffracted wave estimation step.

A raylaunching method considering no diffraction effect is preferably employed for the non-diffracted wave estimation step. Further, a deterministic propagation estimation method in which the component is limited, or a statistical propagation estimation method is preferably employed for the diffracted wave estimation step.

The program in accordance with the present embodiment, which is a program for causing a computer to execute a radio wave propagation characteristic estimation means of estimating propagation characteristic of a radio wave reaching from a predetermined transmission point within a limited evaluation area to a plurality of reception points within the evaluation area, is characterized in that the radio wave propagation characteristic estimation means includes a non-diffracted wave estimation process of estimating the components other than the diffracted wave, out of the radio wave components arriving from the transmission point to the respective reception points, a diffracted wave estimation process of estimating only the diffracted wave component, out of the radio wave components arriving from the transmission point to the respective reception points, and a total radio wave component calculation process of calculating a total radio wave propagation characteristic in the respective reception points considering an estimation result in the non-diffracted wave estimation process and an estimation result in the diffracted wave estimation process.

The program in accordance with the present embodiment, which is a program for causing a computer to execute a radio wave propagation characteristic estimation means of estimating propagation characteristic of a radio wave reaching from a predetermined transmission point within a limited evaluation area to a plurality of reception points within the evaluation area, is characterized in that the radio wave propagation characteristic estimation means includes a non-diffracted wave estimation process of estimating the components other than the diffracted wave, out of the radio wave components arriving from the transmission point to the respective reception points, a diffraction-considering reception point extraction process of extracting the reception point at which the components other than the diffracted wave is within a pre-specified range, out of the respective reception points, as a diffraction-considering reception point based upon the estimation result in the non-diffracted wave estimation process, a diffracted wave estimation process of estimating only the diffracted wave component, out of the radio wave components reaching from the transmission point to the respective reception points extracted as the diffraction-considering reception point, and a total radio wave component calculation process of calculating a total radio wave propagation characteristic in the respective reception points considering an estimation result in the non-diffracted wave estimation process and an estimation result in the diffracted wave estimation process.

A raylaunching method considering no diffraction effect is preferably employed for the non-diffracted wave estimation process. Further, a deterministic propagation estimation method in which the component is limited, or a statistical propagation estimation method is preferably employed for the diffracted wave estimation process.

The invention claimed is:

1. A method of estimating an arrival state of a radio wave at a plurality of reception points without pre-specifying a diffraction-considering reception point, the method comprising:
 a non-diffracted wave estimation operation of estimating an arrival state at each reception point of a radio wave other than a diffracted wave out of the radio waves transmitted from a transmission source by employing a first technique of estimating a radio wave propagation state, the first technique being a deterministic technique taking no diffraction effect into consideration;
 a diffraction-considering reception point choice operation of choosing one or a plurality of diffraction-considering reception points to be a point, at which the diffracted wave arrives, from among the plurality of reception points based upon the arrival state at each reception point of the radio wave other than the diffracted wave estimated in said non-diffracted wave estimation operation;

a diffracted wave arrival state estimation operation of estimating an arrival state of the diffracted wave at the diffraction-considering reception point chosen in said diffraction-considering reception point choice operation by employing a second technique of estimating a radio wave propagation state, the second technique being different from said first technique of estimating a radio wave propagation state and the second technique including estimating a diffractive wave component;

an operation of estimating the arrival state of the radio wave at said diffraction-considering reception point based upon the arrival state of the radio wave other than the diffracted wave estimated in said non-diffracted wave estimation operation and the arrival state of the diffracted wave estimated in said diffracted wave arrival state estimation operation; and an operation of defining the arrival state of the radio wave at each reception point other than said diffraction-considering reception point as the respective arrival state of the radio wave estimated in said non-diffracted wave estimation operation.

2. The radio wave arrival state estimation method according to claim 1, wherein said second technique of estimating a radio wave propagation state is a technique of which an operational load is lighter than that of said first technique of estimating a radio wave propagation state.

3. The radio wave arrival state estimation method according to claim 1, wherein said first technique of estimating a radio wave propagation state is a raylaunching method considering no diffraction effect.

4. The radio wave arrival state estimation method according to claim 1, further comprising, at the time of estimating an arrival state of the diffracted wave in one of said diffraction-considering reception point choice operation and said diffracted wave arrival state estimation operation, employing the diffracted component on an upper surface of a structure existing between said transmission source and at least the one diffraction-considering reception point.

5. The radio wave arrival state estimation method according to claim 1, further comprising, at the time of estimating an arrival state of the diffracted wave in one of said diffraction-considering reception point choice operation and said diffracted wave arrival state estimation operation, in a case where at least the one diffraction-considering reception point exists on a road, employing the diffracted component on a structure of an intersection existing on a route reaching from said transmission source to this diffraction-considering reception point.

6. The radio wave arrival state estimation method according to claim 1, further comprising, at the time of estimating an arrival state of the diffracted wave in one of said diffraction-considering reception point choice operation and said diffracted wave arrival state estimation operation, estimating the diffracted component reaching from said transmission source to at least the one diffraction-considering reception point with a statistical technique.

7. The radio wave arrival state estimation method according to claim 1, further comprising, at the time of estimating an arrival state of the diffracted wave in one of said diffraction-considering reception point choice operation and said diffracted wave arrival state estimation operation, estimating the diffracted component reaching from said transmission source to at least the one diffraction-considering reception point based upon an average value of the radio wave arrival state in the neighborhood of said diffraction-considering reception point estimated in said non-diffracted wave estimation operation.

8. The radio wave arrival state estimation method according to claim 1, further comprising, at the time of estimating an arrival state of the diffracted wave in one of said diffraction-considering reception point choice operation and said diffracted wave arrival state estimation operation, estimating the diffracted component reaching from said transmission source to at least the one diffraction-considering reception point based upon a value in which the diffraction effect on an upper surface or a side wall of a structure that is in prospect from this diffraction-considering reception point has been considered.

9. A system for estimating an arrival state of a radio wave at a plurality of reception points without pre-specifying a diffraction-considering reception point, the system comprising:

a non-diffracted wave estimating device configured to estimate an arrival state at each reception point of a radio wave other than a diffracted wave out of the radio waves transmitted from a transmission source by employing a first technique of estimating a radio wave propagation state, the first technique being a deterministic technique taking no diffraction effect into consideration;

a diffraction-considering reception point choice device configured to choose one or a plurality of diffraction-considering reception points to be a point at which the diffracted wave arrives, from among the plurality of reception points based upon the arrival state at each reception point of the radio wave other than the diffracted wave estimated by said non-diffracted wave estimating device;

a diffracted wave arrival state estimating device configured to estimate an arrival state of the diffracted wave at the diffraction-considering reception point chosen in said diffraction-considering reception point choice device by employing a second technique of estimating a radio wave propagation state, the second technique being different from said first technique of estimating a radio wave propagation state and the second technique including estimating a diffractive wave component;

an arrival state estimating device configured to estimate the arrival state of the radio wave at said diffraction-considering reception point based upon the arrival state of the radio wave other than the diffracted wave estimated by said non-diffracted wave estimating device and the arrival state of the diffracted wave estimated by said diffracted wave arrival state estimating device; and a defining device configured to define the arrival state of the radio wave at each reception point other than said diffraction-considering reception point as the respective arrival state of the radio wave estimated by said non-diffracted wave estimating device.

10. The radio wave arrival state estimation system according to claim 9, wherein said second technique of estimating a radio wave propagation state is a technique of which an operational load is lighter than that of said first technique of estimating a radio wave propagation state.

11. The radio wave arrival state estimation system according to claim 9, wherein said first technique of estimating a radio wave propagation state is a raylaunching method considering no diffraction effect.

12. The radio wave arrival state estimation system according to claim 9, wherein the radio wave arrival state estimation system is further configured to, at the time of estimating an arrival state of the diffracted wave in one of said diffraction-considering reception point choice device and said diffracted wave arrival state estimating device, employ the diffracted component on an upper surface of a structure existing between said transmission source and at least the one diffraction-considering reception point.

13. The radio wave arrival state estimation system according to claim 9, wherein the radio wave arrival state estimation system is further configured to, at the time of estimating an arrival state of the diffracted wave in one of said diffraction-considering reception point choice device and said diffracted wave arrival state estimating device, in a case where at least the one diffraction-considering reception point exists on a road, employ the diffracted component on the structure of an intersection existing on a route reaching from said transmission source to this diffraction-considering reception point.

14. The radio wave arrival state estimation system according to claim 9, wherein the radio wave arrival state estimation system is further configured to, at the time of estimating an arrival state of the diffracted wave in one of said diffraction-considering reception point choice device and said diffracted wave arrival state estimating device, estimate the diffracted component reaching from said transmission source to at least the one diffraction-considering reception point with a statistical technique.

15. The radio wave arrival state estimation system according to claim 9, wherein the radio wave arrival state estimation system is further configured to, at the time of estimating an arrival state of the diffracted wave in one of said diffraction-considering reception point choice device and said diffracted wave arrival state estimating device, estimate the diffracted component reaching from said transmission source to at least the one diffraction-considering reception point based upon an average value of the radio wave arrival state in the neighborhood of said diffraction-considering reception point estimated in said non-diffracted wave estimating device.

16. The radio wave arrival state estimation system according to claim 9, wherein the radio wave arrival state estimation system is further configured to, at the time of estimating an arrival state of the diffracted wave in one of said diffraction-considering reception point choice device and said diffracted wave arrival state estimating device, estimate the diffracted component reaching from said transmission source to at least the one diffraction-considering reception point based upon a value in which the diffraction effect on an upper surface or a side wall of a structure that is in prospect from this diffraction-considering reception point has been considered.

17. A non-transitory computer readable storage medium storing a program causing a computer to execute operations for estimating an arrival state of a radio wave at a plurality of reception points without pre-specifying a diffraction-considering reception point, the operations comprising:

a non-diffracted wave estimation process of estimating an arrival state at each reception point of a radio wave other than a diffracted wave out of the radio waves transmitted from a transmission source by employing a first technique of estimating a radio wave propagation state, the first technique being a deterministic technique taking no diffraction effect into consideration;

a diffraction-considering reception point choice process of choosing one or a plurality of diffraction-considering reception points to be a point, at which the diffracted wave arrives, from among the plurality of reception points based upon the arrival state at each reception point of the radio wave other than the diffracted wave estimated in said non-diffracted wave estimation process;

a diffracted wave arrival state estimation process of estimating an arrival state of the diffracted wave at the diffraction-considering reception point chosen in said diffraction-considering reception point choice process by employing a second technique of estimating a radio wave propagation state, the second technique being different from said first technique of estimating a radio wave propagation state and the second technique including estimating a diffractive wave component a process of estimating the arrival state of the radio wave at said diffraction-considering reception point based upon the arrival state of the radio wave other than the diffracted wave estimated in said non-diffracted wave estimation process and the arrival state of the diffracted wave estimated in said diffracted wave arrival state estimation process; and a process of defining the arrival state of the radio wave at each reception point other than said diffraction-considering reception point as the respective arrival state of the radio wave estimated in said non-diffracted wave estimation process.

18. The computer readable storage medium according to claim 17, wherein said second technique of estimating a radio wave propagation state is a technique of which an operational load is lighter than that of said first technique of estimating a radio wave propagation state.

19. The computer readable storage medium according to claim 17, wherein said first technique of estimating a radio wave propagation state is a raylaunching method considering no diffraction effect.

20. The computer readable storage medium according to claim 17, wherein the operations further comprise, at the time of estimating an arrival state of the diffracted wave in one of said diffraction-considering reception point choice process and said diffracted wave arrival state estimation process, employing the diffracted component on an upper surface of a structure existing between said transmission source and at least the one diffraction-considering reception point.

21. The computer readable storage medium according to claim 17, wherein the operations further comprise, at the time of estimating an arrival state of the diffracted wave in one of said diffraction-considering reception point choice process and said diffracted wave arrival state estimation process, in a case where at least the one diffraction-considering reception point exists on a road, employing the diffracted component on a structure of an intersection existing on a route reaching from said transmission source to this diffraction-considering reception point.

22. The computer readable storage medium according to claim 17, wherein the operations further comprise, at the time of estimating an arrival state of the diffracted wave in one of said diffraction-considering reception point choice process and said diffracted wave arrival state estimation process, estimating the diffracted component reaching from said transmission source to at least the one diffraction-considering reception point with a statistical technique.

23. The computer readable storage medium according to claim 17, wherein the operations further comprise, at the time of estimating an arrival state of the diffracted wave in one of said diffraction-considering reception point choice process and said diffracted wave arrival state estimation process, estimating the diffracted component reaching from said transmission source to at least the one diffraction-considering reception point based upon an average value of the radio wave arrival state in the neighborhood of said diffraction-considering reception point estimated in said non-diffracted wave estimation process.

24. The computer readable storage medium according to claim 17, wherein the operations further comprise, at the time of estimating an arrival state of the diffracted wave in one of said diffraction-considering reception point choice process and said diffracted wave arrival state estimation process, estimating the diffracted component reaching from said transmission source to at least the one diffraction-considering reception point based upon a value in which the diffraction effect on an upper surface or a side wall of the structure that is in prospect from this diffraction-considering reception point has been considered.

* * * * *